United States Patent
Tseng et al.

(10) Patent No.: US 12,388,607 B2
(45) Date of Patent: Aug. 12, 2025

(54) WIRELESS COMMUNICATION METHOD AND WIRELESS COMMUNICATION DEVICE

(71) Applicant: Realtek Semiconductor Corp., HsinChu (TW)

(72) Inventors: Chun-Kai Tseng, HsinChu (TW); Shau-Yu Cheng, HsinChu (TW); Jhe-Yi Lin, HsinChu (TW); Wen-Yung Lee, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 470 days.

(21) Appl. No.: 17/888,531

(22) Filed: Aug. 16, 2022

(65) Prior Publication Data

US 2023/0254093 A1    Aug. 10, 2023

(30) Foreign Application Priority Data

Feb. 8, 2022 (TW) .................. 111104562

(51) Int. Cl.
*H04L 5/00* (2006.01)
*H04W 72/04* (2023.01)
*H04W 72/0453* (2023.01)
*H04W 84/12* (2009.01)

(52) U.S. Cl.
CPC .......... *H04L 5/0055* (2013.01); *H04L 5/0058* (2013.01); *H04W 72/0453* (2013.01); *H04W 84/12* (2013.01)

(58) Field of Classification Search
CPC .... H04L 5/0055; H04L 5/0058; H04W 72/04; H04W 72/0453; H04W 72/20; H04W 84/12; H04W 88/02; H04W 88/08
See application file for complete search history.

(56) References Cited

U.S. PATENT DOCUMENTS

| | | | | |
|---|---|---|---|---|
| 10,116,361 | B2* | 10/2018 | Hedayat | H04W 74/006 |
| 10,201,017 | B2* | 2/2019 | Sun | H04W 8/24 |
| 10,285,202 | B2* | 5/2019 | Chu | H04W 74/002 |
| 10,785,000 | B2* | 9/2020 | Li | H04L 5/0037 |

(Continued)

FOREIGN PATENT DOCUMENTS

EP    3 294 032 B1    3/2021

OTHER PUBLICATIONS

Bankov ,OFDMA Uplink Scheduling in IEEE 802.11ax Networks ,Jul. 30, 2018.

(Continued)

*Primary Examiner* — Alpus Hsu
(74) *Attorney, Agent, or Firm* — Winston Hsu

(57) ABSTRACT

A wireless communication method, applied to a wireless communication device to decide uplink parameters, comprising: (a) determining which one of candidate stations can be at least one target station which can perform uplink transmissions to the wireless communication device; (b) calculating a number of the target station; (c) allocating at least one RU (Resource Unit) to the target station according to the number and pre-recorded reference allocation information, to generate the uplink parameters comprising RU allocation parameters; and (d) generating a trigger frame comprising the uplink parameters and transmitting the trigger frame to the target station.

15 Claims, 6 Drawing Sheets

(56) References Cited

U.S. PATENT DOCUMENTS

| | | | | |
|---|---|---|---|---|
| 10,945,245 B2* | 3/2021 | Chu | .................... | H04W 72/21 |
| 2015/0049729 A1* | 2/2015 | Cho | .................... | H04L 5/0053 |
| | | | | 370/329 |
| 2019/0288767 A1* | 9/2019 | Wang | .................... | H04W 16/12 |
| 2021/0258960 A1* | 8/2021 | Yan | ........................ | H04L 5/001 |
| 2022/0095347 A1* | 3/2022 | Huang | ................. | H04L 1/0047 |
| 2022/0295468 A1* | 9/2022 | Huang | ................. | H04W 72/20 |
| 2023/0209512 A1* | 6/2023 | Baron | .................. | H04W 72/51 |
| | | | | 370/328 |

OTHER PUBLICATIONS

Wang ,Scheduling and Resource Allocation in 802.11ax ,Oct. 11, 2018.

Karaca ,Resource management for OFDMA based next generation 802.11 WLANs ,Aug. 18, 2016.

Kim ,UL-MU Transmissions in IEEE 802.11ax Networks ,Mar. 23, 2020.

Bhattarai ,Uplink Resource Allocation in IEEE 802.11ax ,Jul. 15, 2019.

* cited by examiner

| RU type | RU serial number | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
| 26-tone RU | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
| 52-tone RU | 1 | | 2 | | 3 | | 4 | | 5 | | 6 | | 7 | | 8 | | | 9 | | 10 | | 11 | | 12 | | 13 | | 14 | | 15 | | 16 | | | | | |
| 106-tone RU | 1 | | | 2 | | | | 3 | | | 4 | | | | 5 | | | | 6 | | | 7 | | | 8 | | | | | | | | | | | | |
| 242-tone RU | 1 | | | | | | | | 2 | | | | | | | | | | 3 | | | | | | | 4 | | | | | | | | | | | |
| 484-tone RU | 1 | | | | | | | | | | | | | | | | | | 2 | | | | | | | | | | | | | | | | | | |
| 996-tone RU | 996 + 5 DC | | | | | | | | | | | | | | | | | | | | | | | | | | | | | | | | | | | | |

FIG. 4

WIRELESS COMMUNICATION METHOD AND WIRELESS COMMUNICATION DEVICE

BACKGROUND OF THE INVENTION

1. Field of the Invention

The present invention relates to a wireless communication method and a wireless communication device, and particularly relates to a wireless communication method and a wireless communication device which can efficiently decide uplink parameters.

2. Description of the Prior Art

Under the WiFi mechanism, after the access point (AP) completes the downlink transmission to the station, the station always immediately perform uplink transmission to the AP, thereby the AP can obtain the block acknowledgment (Block ACK) information of its station. Traditionally, for multi-station scenarios, the AP uses the polling method (Block ACK Request) to allow the stations to reply to the Block ACK in sequence. However, the polling process often causes inefficiencies. In order to solve such problem, following the WiFi 802.11ax standard, the AP is allowed to inform the station of the required uplink parameters before performing the uplink transmission. By this way, multiple stations can smoothly perform the uplink transmission at the same time, so as to improve the transmission efficiency. However, in the conventional method, obtaining appropriate uplink parameters is often time-consuming and requires complicated calculations, thus cannot meet the requirement of immediate uplink transmission after downlink transmission.

Therefore, a new method for determining uplink parameters is required.

SUMMARY OF THE INVENTION

One objective of the present invention is to provide a wireless communication method which can efficiently generate uplink parameters.

Another objective of the present invention is to provide a wireless communication device which can efficiently generate uplink parameters.

Still another objective of the present invention is to provide a wireless communication method which can efficiently receive uplink parameters.

One embodiment of the present invention discloses a wireless communication method, applied to a wireless communication device to decide uplink parameters, comprising: (a) determining which one of candidate stations can be at least one target station which can perform uplink transmissions to the wireless communication device; (b) calculating a number of the target station; (c) allocating at least one RU (Resource Unit) to the target station according to the number and pre-recorded reference allocation information, to generate the uplink parameters comprising RU allocation parameters; and (d) generating a trigger frame comprising the uplink parameters and transmitting the trigger frame to the target station.

Another embodiment of the present invention discloses a wireless communication method, applied to a target station to receive uplink parameters of the target station, comprising: receiving a trigger frame from a wireless communication device by the target station, wherein the trigger frame comprises the uplink parameters comprising RU allocation parameters, wherein the RU allocation parameters represent at least one resource unit for the target station.

Still another embodiment of the present invention discloses a wireless communication device, comprising: a transmission interface; and a processing circuit, coupled to the transmission interface; wherein the processing circuit executes at least one program to perform a wireless communication method which comprises: (a) determining which one of candidate stations can be at least one target station which can perform uplink transmissions to the wireless communication device; (b) calculating a number of the target station; (c) allocating at least one RU (Resource Unit) to the target station according to the number and pre-recorded reference allocation information, to generate the uplink parameters comprising RU allocation parameters; and (d) generating a trigger frame comprising the uplink parameters and transmitting the trigger frame to the target station.

In view of above-mentioned embodiments, the AP can efficiently generate the uplink parameters and can efficiently transmit the uplink parameters to the stations.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram illustrating arrangements of RU according to one embodiment of the present invention.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Additionally, the term "first", "second", "third" in following descriptions are only for the purpose of distinguishing different one elements, and do not mean the sequence of the elements. For example, a first device and a second device only mean these devices can have the same structure but are different devices.

Please also note that in the following embodiments, a wireless access points (APs) and stations (STAs) are used as examples for explaining. However, the AP can be replaced by other wireless communication devices. Also, the station can be any electronic device with wireless communication capabilities such as a cell phone, a tablet, a desktop, and the like. In addition, the wireless communication method disclosed in the following embodiments follow the WiFi 802.11ax standard, but can also follow other wireless communication standards.

Figure 1:
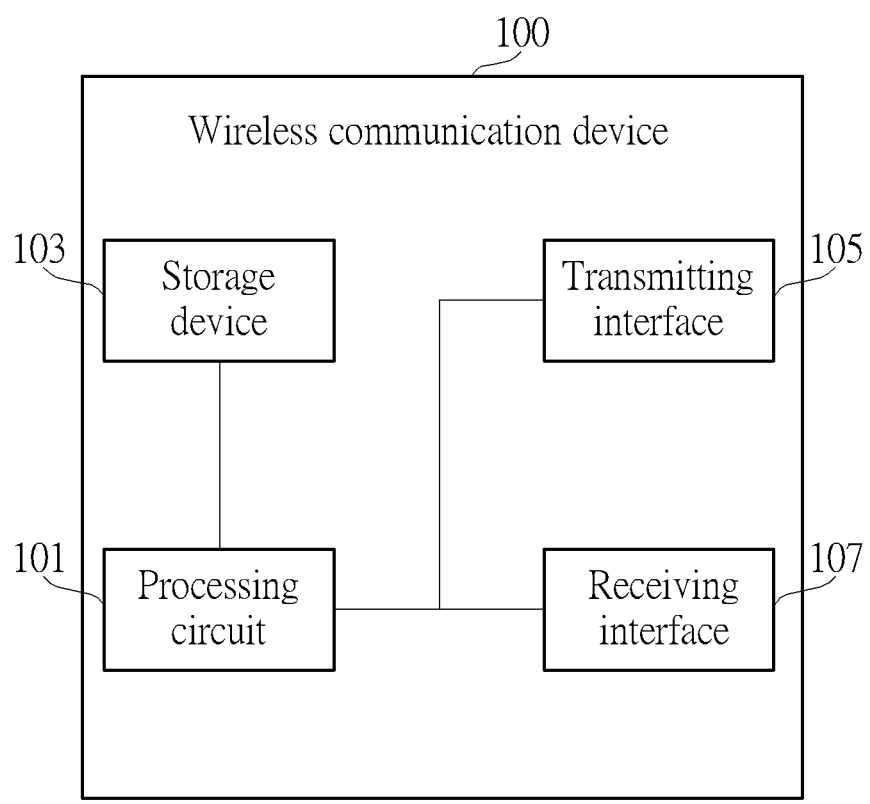
FIG. 1 is a block diagram illustrating a wireless communication device according to one embodiment of the present invention.

FIG. 1 is a block diagram illustrating a wireless communication device 100 according to one embodiment of the present invention. Please also note that in the following embodiments, the wireless communication device 100 is used as the aforementioned AP, but the station may also comprise the structure of the wireless communication device 100 shown in FIG. 1. As illustrated in FIG. 1, the wireless communication device 100 comprises a processing circuit 101, a storage device 103, a transmitting interface 105 and a receiving interface 107. The processing circuit 101 is configured to execute the programs stored in the storage device 103 to perform the wireless communication method provided by the present invention. The storage device 103 can also be located outside the wireless communication device 100 rather than limited to be located in the wireless communication device 100. The transmitting interface 105 is configured to transmit signals and data, and the receiving interface 107 is configured to receive signals and data. The transmitting interface 105 and the receiving interface 107 can also be integrated into a transceiving interface.

Figure 2:
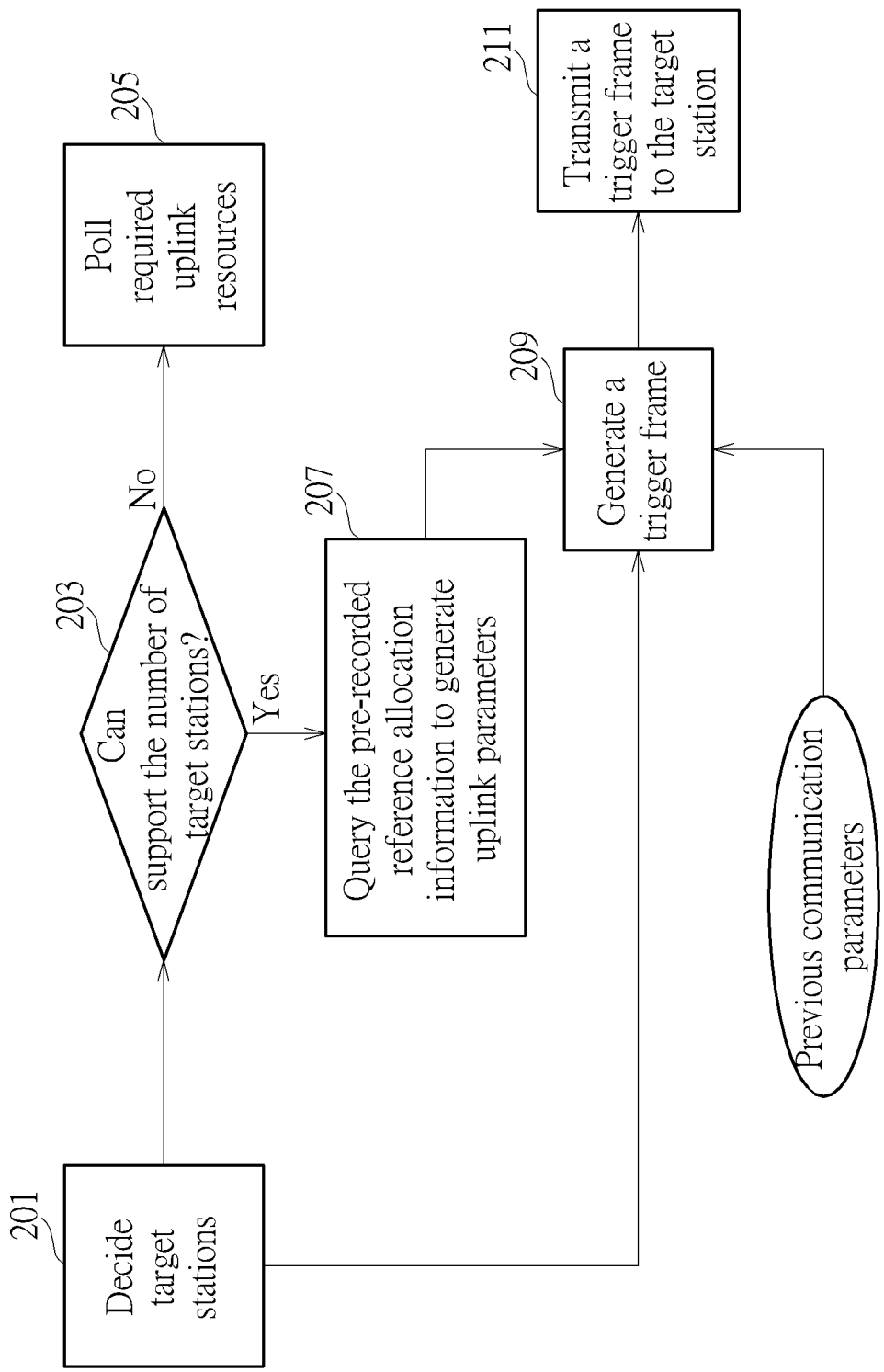
FIG. 2 is a flow chart illustrating an uplink parameter decision method according to one embodiment of the present invention.

FIG. 2 is a flow chart illustrating an uplink parameter decision method according to one embodiment of the present invention, which comprises following steps:

Step 201

The wireless communication device 100 acquires a list of candidate stations that may perform uplink transmission, and decides which one of the candidate stations may perform the next uplink transmission.

For the convenience of explaining, the station which can perform uplink transmission is referred as a target station in the following descriptions. The number of the target station can be 1 or more than 1. The aforementioned list can be acquired in various ways. For example, the candidate stations which can perform uplink transmission can be decided according to the verification information of the candidate stations or the wireless communication standards that the candidate stations can use. However, the scope of the present invention is not limited to these methods.

Step 203

The wireless communication device 100 calculates the number of target stations, and determines if it can support the number of target stations. If not, go to step 205, and if yes, go to step 207.

For example, the wireless communication device 100 can determine if it can support the target station according to the set maximum support number.

Step 205

The wireless communication device 100 polls all target stations for required uplink resources.

For example, the wireless communication device 100 transmits Block ACK requests to all target stations to acquire the station's Block ACK.

Step 207

The wireless communication device 100 queries the pre-recorded reference allocation information to allocate the RU (resource unit) to the target stations to generate uplink parameters comprising the RU allocation parameters.

Step 209

The wireless communication device 100 generates a trigger frame comprising uplink parameters. In addition to the aforementioned RU allocation parameters, the uplink parameters may further comprise target communication parameters of the target station. In one embodiment, the wireless communication device 100 records the previous communication parameters which the target station used before, and determines the target communication parameters of the target station according to the previous communication parameters.

In one embodiment, the target communication parameters comprise a target transmission rate or a target received signal intensity (e.g., RSSI) of the target station. Therefore, the wireless communication device 100 records the previous transmission rate or the previous received signal intensity of the target station, and determines the target transmission rate or the target received signal intensity of the target station according to the previous transmission rate or the previous received signal intensity. That is, the wireless communication device 100 controls the transmission rate of the target station to be the target transmission rate via the uplink parameters, and controls the received signal intensity of the target station to be the target received signal intensity via the uplink parameters.

In one embodiment, a minimum value of the previous transmission rates of all the target stations is used as the target transmission rate, and the minimum value of the previous received signal intensities of all the target stations is used as the target received signal intensity for all the target stations. This ensures that all target stations are functional.

Step 211

The wireless communication device 100 transmits a trigger frame to the target station, so that the target station performs uplink transmission according to the uplink parameters in the trigger frame, and triggers the target station to transmit an ACK to the wireless communication device 100.

Figure 3:
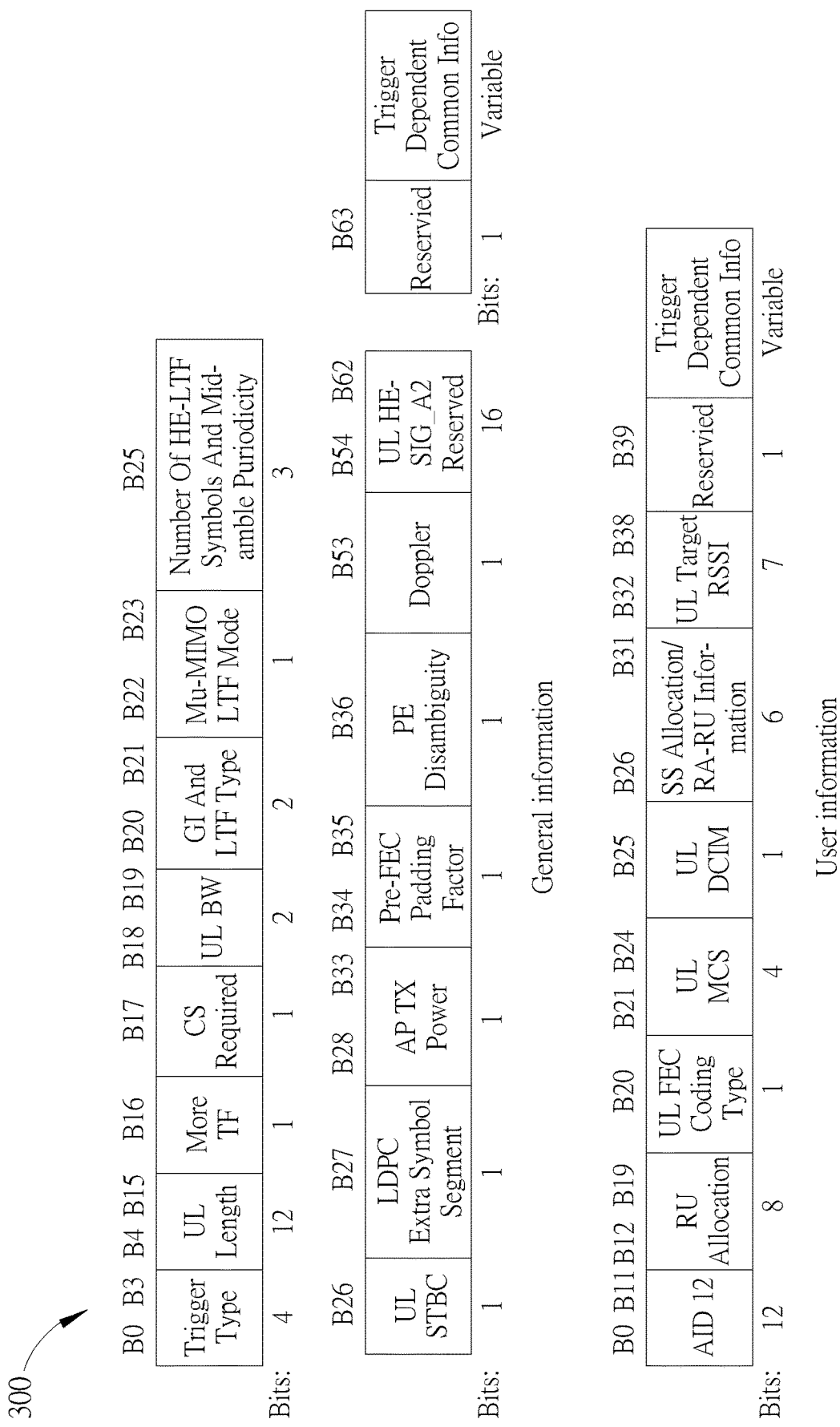
FIG. 3 is a schematic diagram illustrating an example of a trigger frame.

FIG. 3 is a schematic diagram illustrating an example of a trigger frame. The trigger frame 300 in FIG. 3 follows the WiFi 802.11ax standard. As shown in FIG. 3, the trigger frame 300 contains general information and user information. The general information comprises some basic information about uplink transmission, such as the total bandwidth of uplink transmission (UL BW) and the transmission capability of the AP (AP TX Power). The user information comprises indications for the target station, such as the aforementioned RU allocation parameter (RU allocation), the encoding method (UL MCS), and the aforementioned target received signal intensity (UL Target RSSI).

Other parameters not described in FIG. 3 have been defined in the WiFi 802.11ax standard in detail, so descriptions thereof are omitted for brevity here. Please also note that when the wireless communication method of the present invention follows other wireless communication standards, the format or contents of the trigger frame may be different.

As mentioned above, the uplink parameters generated by the wireless communication device 100 comprise the RU allocation parameters, which represent the RU allocation for the target station. The RU allocation parameters are generated based on pre-recorded reference allocation information to allocate at least one RU to the target station. FIG. 4 is a schematic diagram illustrating arrangements of RU according to one embodiment of the present invention, and the following Table 1 is an example of the aforementioned reference allocation information. Please refer to FIG. 4 and the following Table 1 simultaneously for a better understanding of the present invention.

TABLE 1

| AP Bandwidth | Max Support Number | Target station number | RU type | RU serial number |
|---|---|---|---|---|
| 20 | 9 | 2 | RU106 | 1, 2 |
|  |  | 3~4 | RU52 | 1, 2, 3~4 |
|  |  | 5~9 | RU26 | 1, 2, 3, 4, 5~9 |
| 40 | 17 | 2 | RU242 | 1, 2 |
|  |  | 3~4 | RU106 | 1, 2, 3~4 |
|  |  | 5~8 | RU52 | 1, 2, 3, 4, 5~8 |
|  |  | 9~17 | RU26 | 1, 2, 4, 5, 6, 7, 8, 9~17 |
| 80 | 37 | 2 | RU484 | 1, 2 |
|  |  | 3~4 | RU242 | 1, 2, 3~4 |
|  |  | 5~8 | RU106 | 1, 2, 3, 4, 5~8 |
|  |  | 9~16 | RU52 | 1, 2, 3, 4, 5, 6, 7, 8, 9~16 |
|  |  | 17~37 | RU26 | 1, 2, . . . , 16, 17~37 |
| 160 | 74 | 2 | RU996 | 1, 2 |
|  |  | 3~4 | RU484 | 1, 2, 3~4 |
|  |  | 5~8 | RU242 | 1, 2, 3, 4, 5~8 |
|  |  | 9~16 | RU106 | 1, 2, . . . , 8, 9~16 |
|  |  | 17~32 | RU52 | 1, 2, . . . , 16, 17~32 |
|  |  | 33~74 | RU26 | 1, 2, . . . , 32, 33~74 |

In Table 1, "AP Bandwidth" represents the maximum bandwidth that the wireless communication device 100 can support, and "Maximum Support number" represents the maximum number of target stations that the wireless communication device 100 can support. Therefore, "Max Support Number" is proportional to "AP Bandwidth". Step 203 in FIG. 2 can determine if the number of target stations can be supported by the wireless communication device 100 according to the "Max Support Number".

After confirming that the number of target stations can be supported by the wireless communication device 100, the wireless communication device 100 allocates RUs according to its maximum bandwidth and the number of target stations (step 207). For example, when the "AP Bandwidth" is 40 and the number of target stations is 7, the RUs which have a type of 52 tone RU and have serial numbers 1-7 are allocated to the target stations according to Table 1. When the "AP Bandwidth" is 80 and the number of target stations is 20, the RUs which have a type of 26 tone RU and have serial numbers 1-20 are allocated to the target stations according to Table 1. In one embodiment, when RUs are allocated to the target stations, they are allocated in sequence according to the RU numbers. For example, when the "AP Bandwidth" is 40 and the number of target stations is 7, the RU with the serial number 1 is allocated to the first target station, and then the RU with a serial number 2 is allocated the second target station . . . and so on until all target stations are allocated.

Please refer to FIG. 4, the RU type represents how many sub-carriers (tone) the RU uses, that is, how much bandwidth the RU occupies. Also, in FIG. 4, RUs are numbered from low frequency to high frequency. Therefore, in the RU allocation method in Table 1, RUs are allocated to target stations in sequence from a low frequency to a high frequency, and the RUs for each target station have identical bandwidths.

Figure 5:
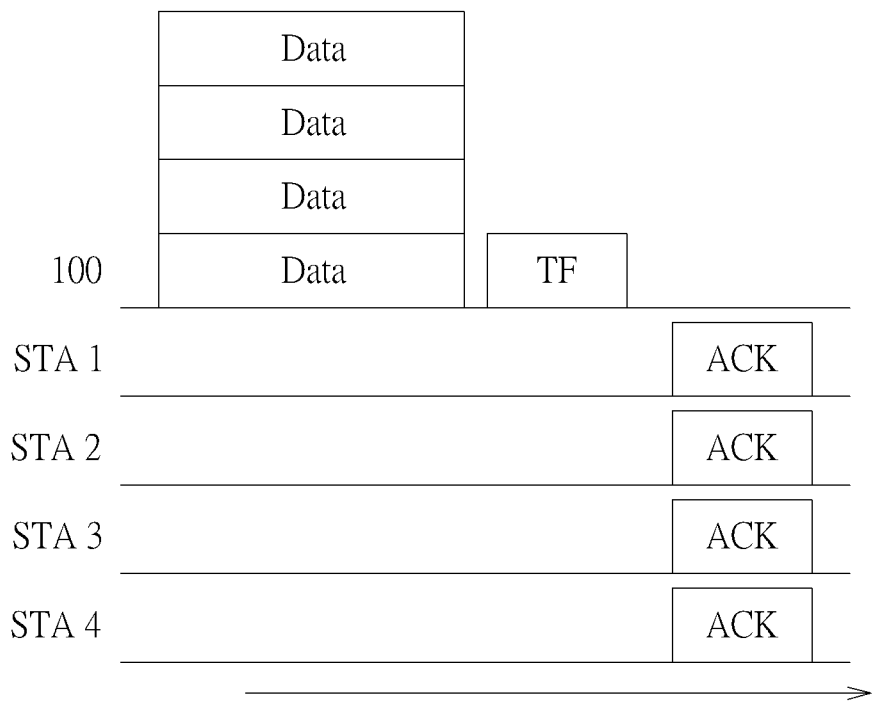
FIG. 5 is a schematic diagram of trigger frame transmission methods according to embodiments of the present invention.
Figure 5:
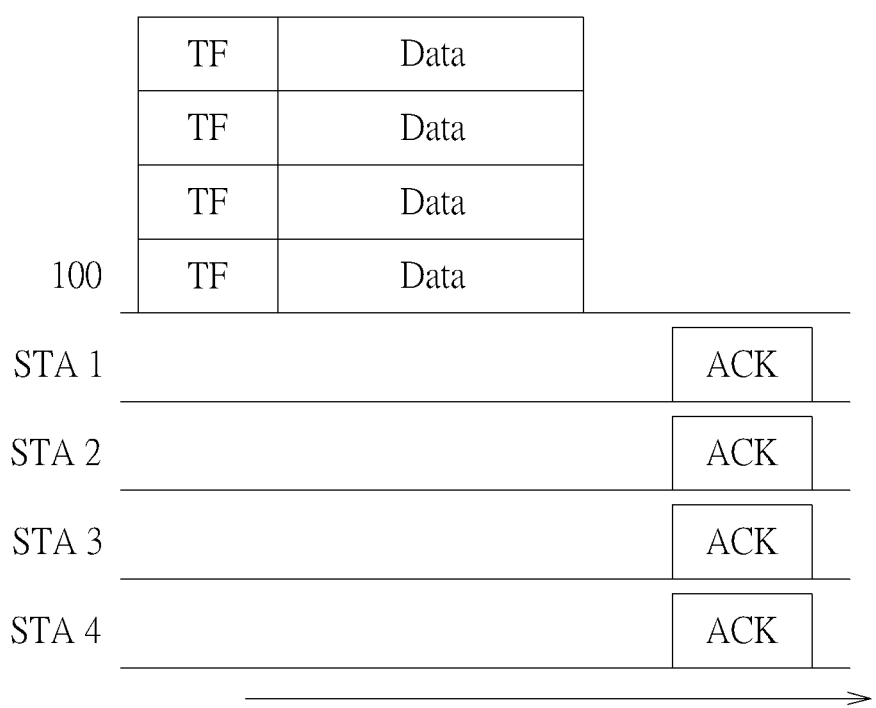

The trigger frame can be transmitted from the AP to the target station in various ways. FIG. 5 is a schematic diagram of trigger frame transmission methods according to embodiments of the present invention, which comprises two methods. One of the methods is shown in the upper part of FIG. 5. After the data transmission in the downlink transmission is completed, the wireless communication device 100 transmits a trigger frame TF (this action is also called BlockAck request, MU-BAR) to request the target station to respond BlockAck following the specified uplink parameters in the trigger frame TF after a specified time. Another method is shown at the bottom of FIG. 5. The trigger frame TF is transmitted to the target station along with the PPDU (Packet Protocol Data Unit) packet in the downlink transmission. This method is also called trigger in data. However, the trigger frame is not limited to be transmitted by these methods.

Figure 6:
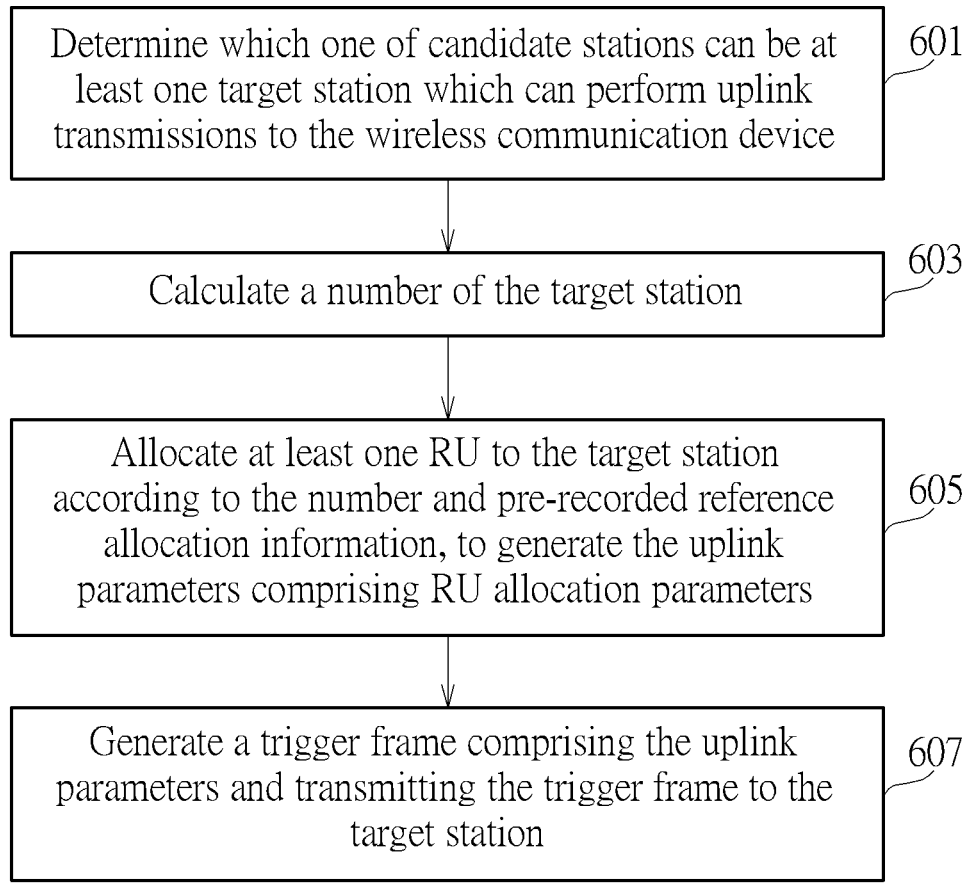
FIG. 6 is a flow chart illustrating a wireless communication method according to one embodiment of the present invention.

According to the above-mentioned embodiments, a wireless communication method for a wireless communication device 100 can be acquired, which can efficiently generate uplink parameters. The wireless communication methods comprises following steps, which are illustrated in FIG. 6.

Step 601

Determine which one of candidate stations can be at least one target station which can perform uplink transmissions to the wireless communication device.

Step 603

Calculate a number of the target station.

Step 605

Allocate at least one RU to the target station according to the number and pre-recorded reference allocation information (e.g., the Table 1), to generate the uplink parameters comprising RU allocation parameters.

Step 607

Generate a trigger frame comprising the uplink parameters and transmitting the trigger frame to the target station As mentioned above, the uplink parameters may further comprise target communication parameters (e.g., step 209).

A wireless communication method for a target station can also be acquired, which comprises: receiving a trigger frame from a wireless communication device by the target station. The trigger frame comprises the uplink parameters comprising RU allocation parameters. The RU allocation parameters represent at least one resource unit for the target station.

In view of above-mentioned embodiments, the AP can efficiently generate the uplink parameters and can efficiently transmit the uplink parameters to the stations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method, applied to a wireless communication device to decide uplink parameters, comprising:
   (a) determining which one of candidate stations can be at least one target station which can perform uplink transmissions to the wireless communication device;
   (b) calculating a number of the at least one target station;
   (c) allocating a Resource Unit (RU) to one of the at least one target station according to the number and pre-recorded reference allocation information, to generate the uplink parameters comprising RU allocation parameters which represent RU allocation for the one of the at least one target station; and
   (d) generating a trigger frame comprising the uplink parameters and transmitting the trigger frame to the one of the at least one target station.

2. The wireless communication method of claim 1, wherein the wireless communication method follows a WiFi 802.11ax standard.

3. The wireless communication method of claim 1, wherein the step (b) further comprises determining if the number can be supported by the wireless communication device;

wherein the step (c) and the step (d) are performed if the number can be supported by the wireless communication device;

wherein the wireless communication device polls the at least one target station for required uplink resources if the number cannot be supported by the wireless communication device.

4. The wireless communication method of claim 1, wherein the step (c) allocates the RU to the one of the at least one target station in sequence from a low frequency to a high frequency.

5. The wireless communication method of claim 1, wherein the uplink parameters comprise target communication parameters, wherein the wireless communication method further comprises:

generating the target communication parameters according to communication parameters which the at least one target station used before.

6. The wireless communication method of claim 5, wherein the target communication parameters comprise a target transmission rate of the at least one target station or a target received signal intensity of the at least one target station.

7. A wireless communication method, applied to a target station to receive uplink parameters of the target station, comprising:

receiving a trigger frame from a wireless communication device by the target station, wherein the trigger frame comprises the uplink parameters comprising Resource Unit (RU) allocation parameters, wherein the RU allocation parameters represent at least one resource unit for the target station, and the at least one resource unit is allocated according to a number of at least one target station and pre-recorded reference allocation information.

8. The wireless communication method of claim 7, wherein the wireless communication method follows a WiFi 802.11ax standard.

9. The wireless communication method of claim 7, wherein the wireless communication device further determines which one of candidate stations can be at least one target station which can perform uplink transmissions to the wireless communication device, and calculates the number of the at least one target station, wherein the target station is one of the at least one target station;

wherein the wireless communication device further determines if the number can be supported by the wireless communication device, the trigger frame is generated if the number can be supported;

wherein the wireless communication device polls the at least one target station for required uplink resources if the number cannot be supported.

10. A wireless communication device, comprising:

a transmission interface; and a processing circuit, coupled to the transmission interface;

wherein the processing circuit executes at least one program to perform a wireless communication method which comprises:

(a) determining which one of candidate stations can be at least one target station which can perform uplink transmissions to the wireless communication device;

(b) calculating a number of the at least one target station;

(c) allocating a Resource Unit (RU) to one of the at least one target station according to the number and pre-recorded reference allocation information, to generate the uplink parameters comprising RU allocation parameters which represent RU allocation for the one of the at least one target station; and (d) generating a trigger frame comprising the uplink parameters and transmitting the trigger frame to the one of the at least one target station.

11. The wireless communication device of claim 10, wherein the wireless communication method follows a WiFi 802.11ax standard.

12. The wireless communication device of claim 10, wherein the step (b) further comprises determining if the number can be supported by the wireless communication device;

wherein the step (c) and the step (d) are performed if the number can be supported by the wireless communication device;

wherein the wireless communication device polls the at least one target station for required uplink resources if the number cannot be supported by the wireless communication device.

13. The wireless communication device of claim 10, wherein the step (c) allocates the one of the at least one RU to the target station in sequence from a low frequency to a high frequency.

14. The wireless communication device of claim 10, wherein the uplink parameters comprise target communication parameters, wherein the wireless communication method further comprises:

generating the target communication parameters according to communication parameters which the at least one target station used before.

15. The wireless communication device of claim 14, wherein the target communication parameters comprise a target transmission rate of the at least one target station or a target received signal intensity of the at least one target station.

* * * * *